US012625576B2

(12) United States Patent
Zhao et al.

(10) Patent No.: US 12,625,576 B2
(45) Date of Patent: May 12, 2026

(54) TOUCH SYSTEM CONTROL METHODS AND ELECTRONIC DEVICE

(71) Applicant: HONOR DEVICE CO., LTD., Shenzhen (CN)

(72) Inventors: Guangxu Zhao, Shenzhen (CN); Juncheng Tian, Shenzhen (CN); Shuaifei Ji, Shenzhen (CN); Yue Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/846,213

(22) PCT Filed: Sep. 5, 2023

(86) PCT No.: PCT/CN2023/116947
§ 371 (c)(1),
(2) Date: Sep. 11, 2024

(87) PCT Pub. No.: WO2024/078199
PCT Pub. Date: Apr. 18, 2024

(65) Prior Publication Data
US 2025/0199636 A1 Jun. 19, 2025

(30) Foreign Application Priority Data
Oct. 11, 2022 (CN) .......................... 202211239886.6

(51) Int. Cl.
G06F 3/041 (2006.01)
G06F 3/0354 (2013.01)
(Continued)

(52) U.S. Cl.
CPC ...... G06F 3/04162 (2019.05); G06F 3/03545 (2013.01); G06F 3/0383 (2013.01); G06F 3/04166 (2019.05); G06F 3/044 (2013.01)

(58) Field of Classification Search
CPC ............. G06F 3/04162; G06F 3/04166; G06F 3/03545; G06F 3/0383; G06F 3/044
See application file for complete search history.

(56) References Cited

U.S. PATENT DOCUMENTS

2011/0061947 A1 3/2011 Krah et al.
2013/0265276 A1 10/2013 Obeidat et al.
(Continued)

FOREIGN PATENT DOCUMENTS

CN 101937291 A 1/2011
CN 103558941 A 2/2014
(Continued)

*Primary Examiner* — Lisa S Landis
(74) *Attorney, Agent, or Firm* — WOMBLE BOND DICKINSON (US) LLP

(57) ABSTRACT

This application provides a touch system control method and an electronic device. The method includes: in an active mode, controlling, by a touch chip, a touch panel to perform two-dimensional data scanning at a first frequency to obtain first scanned data; sending, by the touch chip, the first scanned data to a host at the first frequency; when the host determines, according to the first scanned data, that no valid touch signal is detected, switching, by the host, to an async idle mode, where in the async idle mode, the touch chip controls the touch panel to perform two-dimensional data scanning at the first frequency to obtain second scanned data, and sends the second scanned data to the host at a second frequency; the second frequency is less than the first frequency.

15 Claims, 6 Drawing Sheets

(51) Int. Cl.
    *G06F 3/038*         (2013.01)
    *G06F 3/044*         (2006.01)

(56)           References Cited

U.S. PATENT DOCUMENTS

| | | | |
|---|---|---|---|
| 2015/0098031 A1 | 4/2015 | Kurokawa | |
| 2020/0264727 A1 | 8/2020 | Lee et al. | |
| 2023/0205359 A1* | 6/2023 | Wang | G06F 3/0446 |
| | | | 345/174 |

FOREIGN PATENT DOCUMENTS

| | | | | |
|---|---|---|---|---|
| CN | 111381661 | A | 7/2020 | |
| CN | 113204295 | * 8/2021 | | G06F 3/044 |
| CN | 113204295 | A | 8/2021 | |
| CN | 114035702 | A | 2/2022 | |
| CN | 116339531 | A | 6/2023 | |

\* cited by examiner

Electronic device 100

TOUCH SYSTEM CONTROL METHODS AND ELECTRONIC DEVICE

CROSS-REFERENCE TO RELATED APPLICATIONS

This application is a national stage of International Application No. PCT/CN2023/116947, filed on Sep. 5, 2023, which claims priority to Chinese Patent Application No. 202211239886.6, filed on Oct. 11, 2022, both of which are incorporated herein by reference in their entireties.

TECHNICAL FIELD

This application relates to the field of terminal devices, and particularly relates to a touch system control methods and an electronic device.

BACKGROUND

At present, touch is a main way for human-computer interactions in an electronic device. A user inputs information to the electronic device by performing a touch operation on a display screen of the electronic device.

A touch system in the electronic device is frequently used. Therefore, power consumption of the touch system has a significant impact on the overall power consumption of the electronic device, and also has a significant impact on the standby time of the electronic device.

SUMMARY

In order to solve the above technical problems, this application provides a touch system control method and an electronic device. When no valid touch signal is detected, an original scanning frequency of a touch chip in the electronic device is kept, a data reporting frequency is reduced, and a data processing frequency of a host is reduced to reduce the power consumption of the host, thereby reducing the overall power consumption of the electronic device.

According to a first aspect, this application provides a touch system control method. The method is applied to an electronic device. The electronic device includes a touch chip, a touch panel, and a host. The method includes: in an active mode, controlling, by a touch chip, a touch panel to perform two-dimensional data scanning at a first frequency to obtain first scanned data, where the first scanned data is used for detecting a touch position; sending, by the touch chip, the first scanned data to the host at the first frequency; when the host determines, according to the first scanned data, that no valid touch signal is detected on a screen of the electronic device, switching, by the host, to an async idle mode and sending a first command for switching to the async idle mode to the touch chip; and switching, by the touch chip, to the async idle mode according to the first command, where in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position In this way, when no valid touch signal is detected, an original scanning frequency of the touch chip in the electronic device is kept, a data reporting frequency is reduced, and a data processing frequency of the host is reduced to reduce the power consumption of the host, thereby reducing the overall power consumption of the electronic device.

According to the first aspect, after the switching, by the host, to an async idle mode, the method further includes: sending, by the host, a first notification to the touch chip, where the first notification is used for instructing, when the touch chip detects no valid conductor signal within first time after receiving the first notification, the touch chip to switch to an idle mode after the first time.

According to the first aspect, the method further includes: in the async idle mode, when the touch chip detects no valid conductor signal within the first time after the receiving the first notification, switching, by the touch chip, to the idle mode; and in the idle mode, controlling, by the touch chip, the touch panel to perform low-power scanning at the first frequency to obtain third scanned data, and sending the third scanned data to the host at the second frequency, where the third scanned data is used for detecting whether there is a conductor approaching the screen.

According to the first aspect, after the switching, by the touch chip, to the idle mode, the method further includes: in the idle mode, when the touch chip detects a valid conductor signal, switching, by the touch chip, to the active mode, and sending fourth scanned data acquired in the active mode and an active mode identifier to the host, where the fourth scanned data is used for detecting the touch position; and switching, by the host, to the active mode according to the active mode identifier, and determining the touch position according to the fourth scanned data.

According to the first aspect, the method further includes: in the async idle mode, when the touch chip detects a valid conductor signal within the first time after receiving the first notification, switching, by the touch chip, to the active mode, and sending fourth scanned data acquired in the active mode and an active mode identifier to the host, where the fourth scanned data is used for detecting the touch position; and switching, by the host, to the active mode according to the active mode identifier, and determining the touch position according to the fourth scanned data.

According to the first aspect, the low-power scanning is self-capacitance scanning or mutual-capacitance scanning.

According to the first aspect, the first frequency is 120 HZ or 240 HZ, and the second frequency is 1 HZ.

According to a second aspect, this application provides a touch system control method, applied to an electronic device. The electronic device includes a touch chip, a touch panel, and a host. The method includes: in an active mode, controlling, by a touch chip, a touch panel to perform two-dimensional data scanning at a first frequency to obtain first scanned data, where the first scanned data is used for detecting a touch position; sending, by the touch chip, the first scanned data to the host at the first frequency; receiving, by the touch chip, a first command sent by the host for switching to an async idle mode, where the first command is sent when the host determines, according to the first scanned data, that no valid touch signal is detected on a screen of the electronic device and the touch chip switches to the async idle mode; and switching, by the touch chip, to the async idle mode according to the first command, where in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position According to the second aspect, after sending, by the touch chip, the first scanned data to the host at the first frequency, the method further includes: receiving, by the touch chip, a first notification sent by the host, where the first notification is used for instructing, when the touch chip detects no valid conductor signal within first time after receiving the first notification, the touch chip to switch to an idle mode after the first time.

According to the second aspect, the method further includes: in the async idle mode, when the touch chip detects no valid conductor signal within the first time after the receiving the first notification, switching, by the touch chip, to the idle mode; and in the idle mode, controlling, by the touch chip, the touch panel to perform low-power scanning at the first frequency to obtain third scanned data, and sending the third scanned data to the host at the second frequency, where the third scanned data is used for detecting whether there is a conductor approaching the screen.

According to the second aspect, after the switching, by the touch chip, to the idle mode, the method further includes: in the idle mode, when the touch chip detects a valid conductor signal, switching, by the touch chip, to the active mode, and sending fourth scanned data acquired in the active mode and an active mode identifier to the host, where the fourth scanned data is used for detecting the touch position to cause the host to switch to the active mode according to the active mode identifier and determine the touch position according to the fourth scanned data.

According to the second aspect, the method further includes: in the async idle mode, when the touch chip detects a valid conductor signal within the first time after receiving the first notification, switching, by the touch chip, to the active mode, and sending fourth scanned data acquired in the active mode and an active mode identifier to the host, where the fourth scanned data is used for detecting the touch position to cause the host to switch to the active mode according to the active mode identifier and determine the touch position according to the fourth scanned data.

According to a third aspect, this application provides a touch system control method, applied to an electronic device. The electronic device includes a touch chip, a touch panel, and a host. The method includes: in an active mode, receiving, by the host, first scanned data sent by the touch chip, where the first scanned data is scanned data obtained by the touch chip controlling, in the active mode, the touch panel to perform two-dimensional data scanning at a first frequency, and the first scanned data is used for detecting a touch position; determining, by the host, according to the first scanned data, whether a valid touch signal is detected on a screen of the electronic device; when no valid touch signal is detected, switching, by the host, to an async idle mode; and sending, by the host, to the touch chip, a first command for switching to the async idle mode to cause the touch chip to switch to the async idle mode according to the first command, where in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position.

According to the third aspect, after the switching, by the host, to an async idle mode, the method further includes: sending, by the host, a first notification to the touch chip, where the first notification is used for instructing, when the touch chip detects no valid conductor signal within first time after receiving the first notification, the touch chip to switch to an idle mode after the first time.

According to the third aspect, the method further includes: receiving, by the host, fourth scanned data and an active mode identifier sent by the touch chip, where the fourth scanned data and the active mode identifier are sent when the touch chip detects a valid conductor signal in the idle mode and the touch chip switches to the active mode; and switching, by the host, to the active mode according to the active mode identifier, and determining the touch position according to the fourth scanned data.

According to a fourth aspect, this application provides an electronic device, including: a memory and a processor, where the memory is coupled to the processor; the memory stores program instructions; and the program instructions, when executed by the processor, cause the electronic device to perform any touch system control method in the second aspect, or to perform any touch system control method in the third aspect.

According to a fifth aspect, this application provides a computer-readable storage medium, including a computer program. The computer program, when run on an electronic device, causes the electronic device to perform any touch system control method in the second aspect, or to perform any touch system control method in the third aspect.

DESCRIPTION OF EMBODIMENTS

Figure 1:
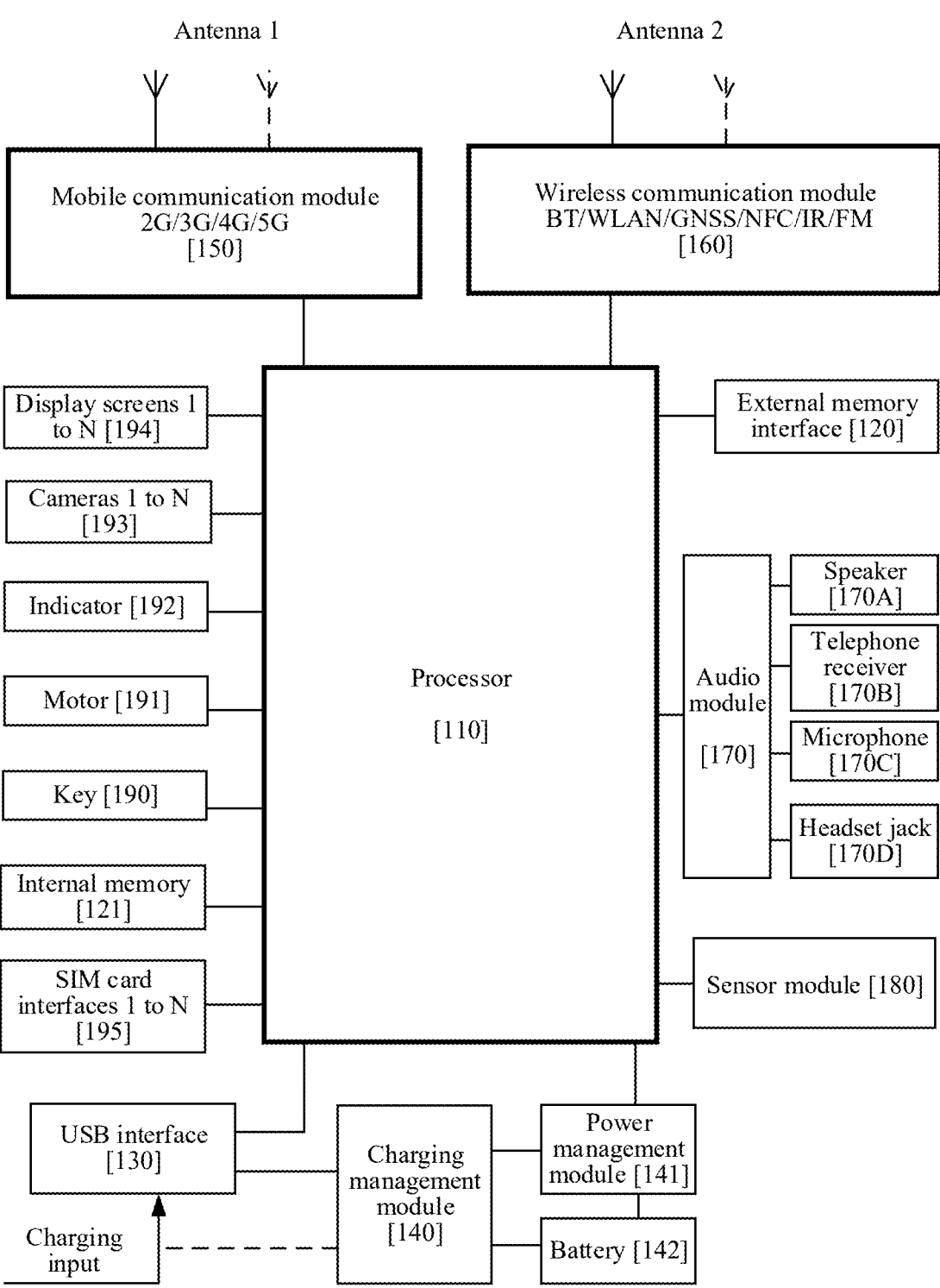
FIG. 1 is a schematic structural diagram exemplarily showing an electronic device 100.

The technical solutions in the embodiments of this application are clearly and described below with reference to the accompanying drawings in the embodiments of this application. Apparently, the described embodiments are merely some rather than all of the embodiments of this application. All other embodiments obtained by a person of ordinary skill in the art based on the embodiments of this application without making creative efforts shall fall within the protection scope of this application.

The term "and/or" used herein describes only an association relationship for describing associated objects and represents that three relationships may exist. For example, A and/or B may represent the following three cases: only A exists, both A and B exist, and only B exists.

In the specification and claims in the embodiments of this application, the terms "first", "second", and the like are intended to distinguish different objects but do not indicate a particular order of the objects. For example, a first target object and a second target object are intended to distinguish different target objects, but do not indicate a particular order of the target objects.

In the embodiments of this application, the terms such as "exemplary", "for example", and the like are used to represent as an example, an illustration, or a description. Any embodiment or design scheme described by using "exemplary" or "for example" in the embodiments of this application should not be explained as being more preferred or having more advantages than another embodiment or design scheme. In particular, the terms such as "exemplarily" or "for example" as used herein are intended to present the related concept in a specific implementation.

In the description of the embodiments of this application, unless otherwise stated, "a plurality of" means two or more. For example, a plurality of processing units mean two or more processing units; and a plurality of systems mean two or more systems.

In this specification, a touch system includes a touch chip (namely, TPIC) and a touch panel. The touch chip may be configured to control a scanning method and a scanning frequency of the touch panel, obtain scanned data acquired by the touch panel, and transmit the scanned data to a host. The touch panel includes a plurality of touch sensors.

The touch chip in the embodiments of this application includes a touch system control module.

The embodiments of this application provide a touch system control method that may reduce the power consumption of a host in an electronic device, thereby reducing the power consumption of the entire electronic device and prolonging the standby time of the electronic device.

The touch system control method in the embodiments of this application may be applied to an electronic device. The electronic device is, for example, a mobile phone, a tablet, a personal computer (PC), a wearable electronic device, an automobile control panel, an electric vehicle control panel, and the like.

The structure of the electronic device in this embodiment may be as shown in FIG. 1.

FIG. 1 is a schematic structural diagram exemplarily showing an electronic device 100. It should be understood that the electronic device 100 shown in FIG. 1 is only an example of the electronic device, and the electronic device 100 may have more or fewer components than those shown in the figure, may combine two or more components, or may have a different component configuration. Various components shown in FIG. 1 may be implemented by hardware, software, or a combination of hardware and software that includes one or more signal processing circuits and/or application specific integrated circuits.

Referring to FIG. 1, the electronic device 100 may include: a processor 110, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, an indicator 192, a camera 193, and the like.

The processor 110 may include one or more processing units. For example: the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors.

The controller may be a nerve center and a command center of the electronic device 100. The controller may generate an operation control signal according to an instruction operation code and a timing signal, and control obtaining and executing of instructions.

A memory may also be arranged in the processor 110 to store instructions and data. In some embodiments, the memory in processor 110 is a cache memory.

The electronic device 100 implements a display function by using the GPU, a display screen 194, the application processor, and the like. The GPU is a microprocessor for image processing and is connected to the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), and the like. In some embodiments, the electronic device 100 may include one or N display screens 194. N is a positive integer greater than one.

The sensor module 180 in the electronic device 100 may include a pressure sensor 180A, a gyro sensor 180B, an air pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

The touch sensor 180K is also referred to as a "touch panel". The touch sensor 180K may be arranged on the display screen 194. The touch sensor 180K and the display screen 194 form a touchscreen which also referred to as "touch screen". The touch sensor 180K is configured to detect a touch operation performed on or near the touch sensor. The touch sensor may transfer the detected touch operation to the application processor to determine a type of a touch event. The touch sensor may provide a visual output related to the touch operation by using the display screen 194. In some other embodiments, the touch sensor 180K may also be arranged on a surface of the electronic device 100 at a position different from that of the display screen 194.

A software system of the electronic device 100 may use a layered architecture, an event-driven architecture, a micro-kernel architecture, a micro service architecture, or a cloud architecture. In this embodiment of this application, the software structure of the electronic device 100 is exemplarily described by using an Android (Android) system with a layered architecture as an example.

Figure 2:
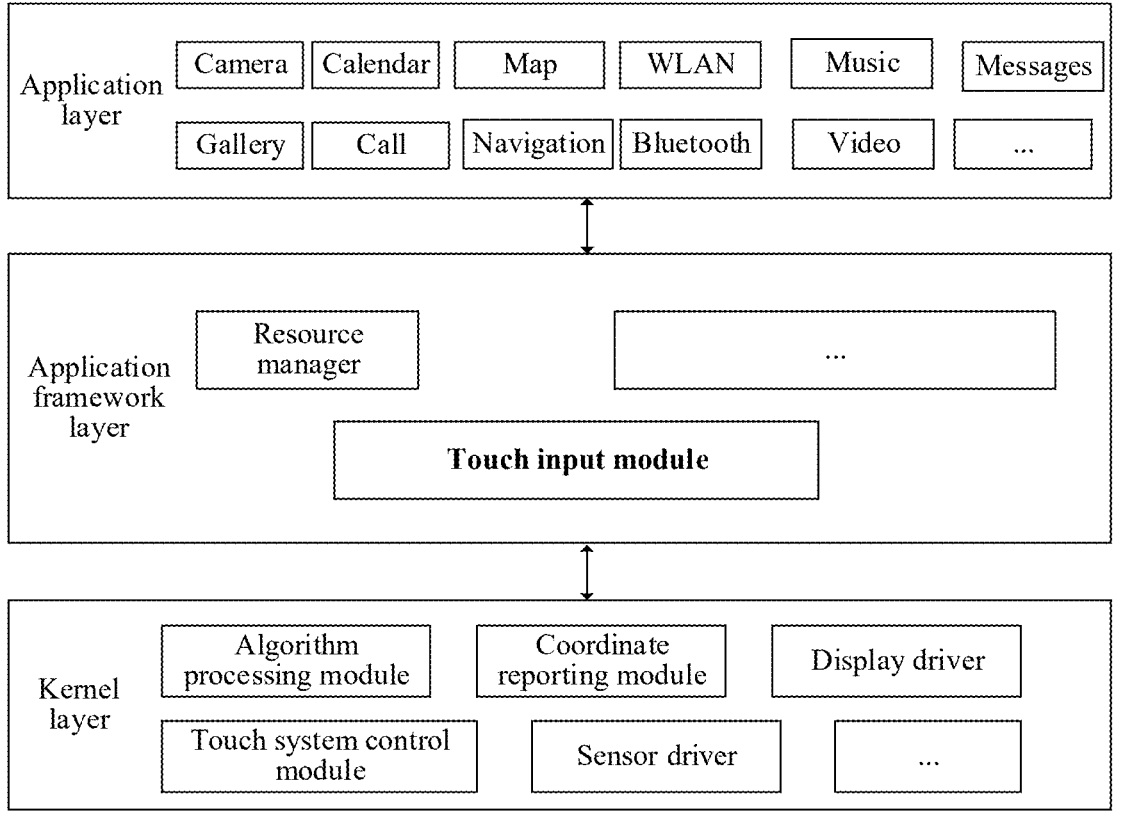
FIG. 2 is a block diagram exemplarily showing a software structure of an electronic device 100 according to an embodiment of this application.

FIG. 2 is a block diagram exemplarily showing a software structure of an electronic device 100 according to an embodiment of this application.

In the layered architecture of the electronic device 100, software is divided into several layers, and each layer has a clear role and task. The layers communicate with each other through a software interface. In some embodiments, the Android system may include an application layer, an application framework layer, a system layer, a kernel layer, and the like.

The application layer may include a series of application packages.

As shown in FIG. 2, the application packages may include applications such as camera, calendar, map, WLAN, music, messages, gallery, call, navigation, Bluetooth, and video.

The application framework layer provides an application programming interface (application programming interface, API) and a programming framework for the applications at the application layer. The application framework layer includes some predefined functions.

As shown in FIG. 2, the application framework layer may include a resource manager, a touch input module, and the like.

The resource manager provides various resources such as localized character strings, icons, pictures, layout files, and video files for the applications.

The touch input module is configured to receive touch position information (also referred to as touch position information) reported by the host. The touch chip obtains scanned data acquired by the touch panel, and then transmits the scanned data to the host through a data transmission circuit between the touch chip and the host. The host uses a preset algorithm to process the scanned data to obtain the touch position information (such as coordinates of a touch position). Then, the host reports the touch position information to the touch input module.

The Android runtime (Android Runtime) includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is used to execute functions such as object lifecycle management, stack management, thread management, security and exception management, and garbage collection.

The kernel layer is a layer between hardware and software.

As shown in FIG. 2, the kernel layer may include an algorithm processing module, a coordinate reporting module, a touch system control module, a display driver, a sensor driver, and other modules. The algorithm processing module and the coordinate reporting module are modules in the host, and the touch system control module is a module in the touch chip.

It may be understood that the layers the software structure and the components included in the various layers shown in FIG. 2 do not constitute a specific limitation on the electronic device 100. In some other embodiments of this application, the electronic device 100 may include more or fewer layers than illustrated layers, and each layer may include more or fewer components. This will not be limited in this application.

This application will be described in detail below through embodiments.

In this embodiment, the touch chip has three scanning modes:

first mode: active mode (Active Mode),
  second mode: async idle mode (Async Idle Mode), and
  third mode: idle mode (Idle Mode).

In this specification, the scanned data is capacitance value data obtained by scanning a touch screen.

In this specification, finger touch is taken as an example for explanation. Those skilled in the art should understand that the following explanation that the finger touch is taken as an example is also applicable to a situation where a stylus is used for touching.

In the active mode, the touch chip controls the touch sensor in the touch panel to perform two-dimensional data scanning on the touch screen at a first frequency (such as 120 Hz or higher) to acquire capacitance value data used for detecting a position of a touch finger. Meanwhile, in the active mode, the touch chip performs interruption at the first frequency to notify the host to read the scanned capacitance value data, that is, the touch chip sends the scanned data to the host at the first frequency. In this way, in the active mode, a frequency at which the host reads and processes the scanned data is the first frequency. When the touch chip performs one interruption, the host reads the scanned data from the touch chip once. Therefore, the frequency at which the host reads the scanned data from the touch chip is consistent with the frequency at which the touch chip performs the interruption. The frequency at which the host processes the scanned data is also consistent with the frequency at which the host reads the scanned data from the touch chip.

In the async idle mode, the touch chip controls the touch sensor in the touch panel to still perform two-dimensional data scanning at the first frequency to acquire capacitance value data used for detecting the position of the touch finger. However, in the async idle mode, the touch chip performs host interruption at a second frequency to notify the host to read the scanned capacitance value data, that is, the touch chip sends the scanned data to the host at the second frequency. The second frequency is much less than the first frequency. For example, the second frequency may be 1 HZ. In this way, in the async idle mode, the frequency at which the host reads and processes the scanned data is the second frequency.

In the idle mode, the touch chip controls the touch sensor in the touch panel to perform low-power scanning at the first frequency, such as low-power mutual-capacitance scanning or low-power self-capacitance scanning, to acquire capacitance value data used for detecting whether there is a conductor such as a finger approaching the screen of the electronic device. Moreover, in the idle mode, the touch chip performs host interruption at the second frequency to notify the host to read the scanned capacitance value data, that is, the touch chip sends the scanned data to the host at the second frequency. In this way, in the idle mode, the frequency at which the host reads and processes the scanned data is the second frequency.

It should be noted that, a data amount of a frame of capacitance value data acquired when the touch chip performs scanning in the low-power scanning mode is less than a data amount of a frame of capacitance value data acquired when the touch chip performs scanning in a two-dimensional data scanning mode.

The scanning modes of the touch chip and the frequency at which the host reads and processes the scanned data in the three scanning modes are as shown in Table 1 below.

TABLE 1

| Scanning mode | Scanning mode: | Frequency at which the host reads and processes the scanned data |
|---|---|---|
| Active mode | Two-dimensional data scanning | First frequency |

TABLE 1-continued

| Scanning mode | Scanning mode: | Frequency at which the host reads and processes the scanned data |
|---|---|---|
| Async idle mode | Two-dimensional data scanning | Second frequency |
| Idle mode | Low-power scanning | Second frequency |

Figure 3:
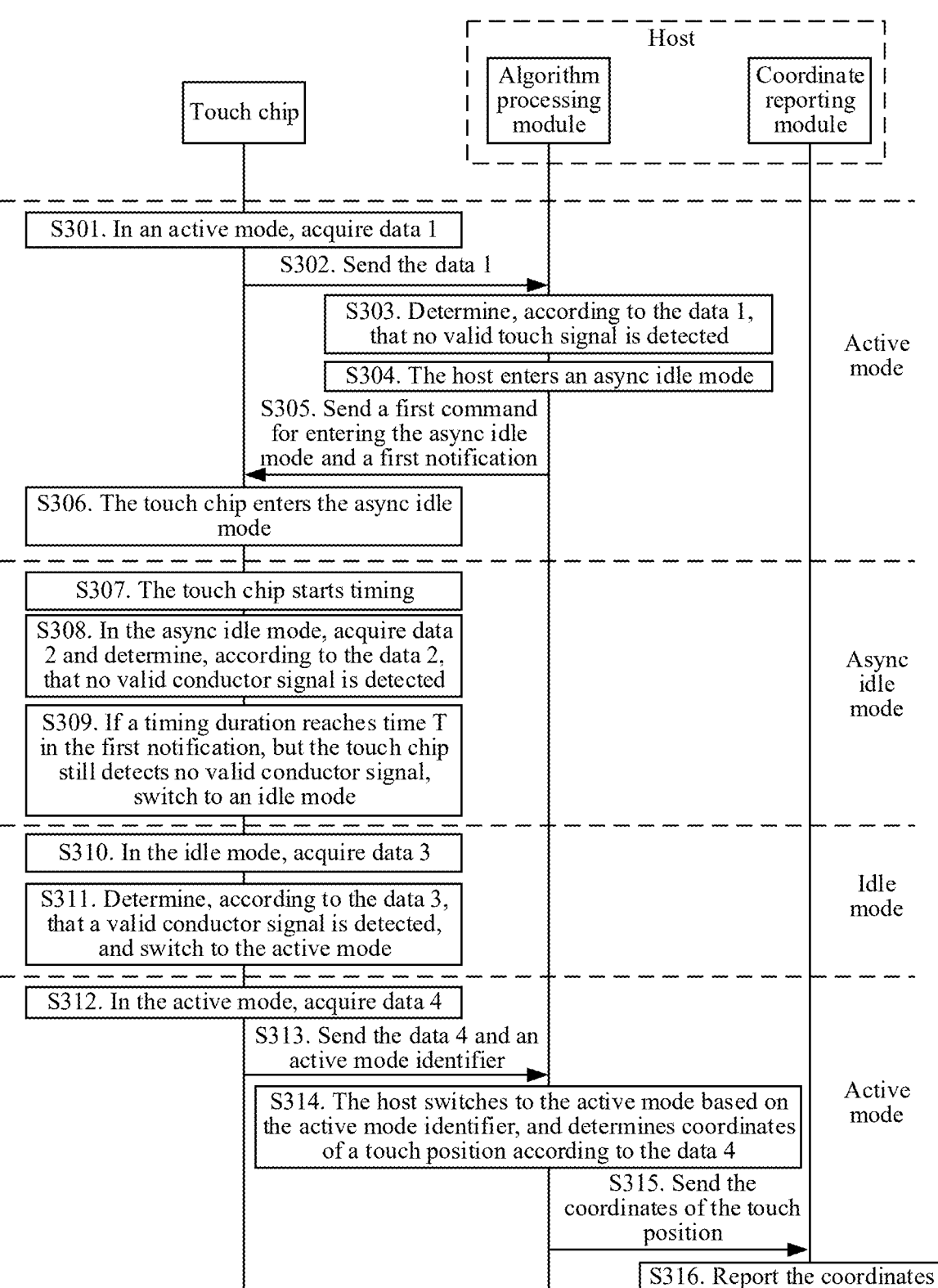
FIG. 3 is a schematic diagram exemplarily showing an interaction between a touch chip and a host in an electronic device.

FIG. 3 is a schematic diagram exemplarily showing an interaction between a touch chip and a host in an electronic device. In this embodiment, an operation of the touch chip is performed by a touch system control module in the touch chip.

Referring to FIG. 3, in the embodiments of this application, an interaction process between the touch chip in an electronic device and the host may include the following steps:

S301. In an active mode, the touch chip acquires data 1.

In this step, the touch chip acquires the data 1 at a first frequency. The data 1 is capacitance value data that may be used for detecting a position of a touch finger. The data 1 may be a two-dimensional capacitance value matrix. Capacitance values in this matrix may correspond to position coordinates on a touch screen in a one-to-one manner.

S302. The touch chip sends the data 1 to the host.

In one example, an algorithm processing module of the host is configured to receive the data 1 sent by the touch chip and process the data 1 according to a preset algorithm.

If the data 1 is acquired when there is finger touch on the screen, a data processing result of the data 1 processed by the algorithm processing module indicates coordinates of a finger touch position. If the data 1 is acquired when there is no finger touch on the screen, a data processing result of the data 1 processed by the algorithm processing module indicates that no information of a valid touch signal is detected.

For example, when there is finger touch on the screen, a capacitance value of the finger touch position on the touch screen may exceed a preset first capacitance value threshold. Based on this, if the algorithm processing module finds, via analysis of the data 1, that a capacitance value at a certain position exceeds the capacitance value threshold, coordinates corresponding to the position where the capacitance value exceeding the first capacitance value threshold is located may be output. If the algorithm processing module finds, via analysis of the data 1, that a capacitance value at any position on the touch screen does not exceed the first capacitance value threshold, it may be determined that no valid touch signal is detected, and information indicating that no valid touch signal is detected may be output.

S303. The host determines, according to the data 1, that no valid touch signal is detected.

When the data processing result of the data 1 processed by the algorithm processing module in the host is the information indicating that no valid touch signal is detected, it may be determined that no valid touch signal is detected. For example, when a user touches the screen of the electronic device with a finger and then raises the finger, the host will detect no valid touch signal.

S304. The host enters an async idle mode.

When the host detects no valid touch signal, it indicates that the finger of the user or another conductor (such as a special stylus for the electronic device) has been raised and does not touch the screen. At this time, the host immediately switches from the active mode to the async idle mode.

S305. The host sends a first command for entering the async idle mode and a first notification to the touch chip.

The first command is used for instructing the touch chip to switch to the async idle mode. The first notification is used for notifying that the touch chip switches to an idle mode after time T if the touch chip detects no valid conductor signal within time T after receiving the first notification.

The valid conductor signal is a conductor signal with signal strength greater than a first strength threshold set by the touch chip.

S306. The touch chip enters the async idle mode.

After receiving the first command, the touch chip immediately enters the async idle mode according to an indication of the first command.

S307. The touch chip starts timing.

After receiving the first notification, the touch chip starts timing, and a timing duration is time T in the first notification.

S308. In the async idle mode, the touch chip acquires data 2 and determines, according to the data 2, that no valid conductor signal is detected.

In the async idle mode, the touch chip acquires the data 2 at the first frequency mentioned above, and the data 2 is also two-dimensional scanned data. A scanning mode of the touch chip in the async idle mode is the same as that in the active mode. Scanned data that may be used for detecting a touch position may also be acquired in the async idle mode.

In this way, if a conductor such as a finger or a stylus approaches to the touch screen during the async idle mode, the touch chip will detect a valid conductor signal. In this case, the touch chip may directly send the acquired two-dimensional scanned data to the host without switching to the active mode before acquisition, thereby ensuring a quick response to touch.

S309. If the timing duration reaches time T in the first notification, but the touch chip still detects no valid conductor signal, the touch chip switches to the idle mode.

The touch chip performs scanning and data acquisition at the first frequency within time T after entering the async idle mode. If the touch chip determines, according to all data acquired within time T, that no valid conductor signal is detected, it indicates that there is no conductor such as a finger or a stylus approaching the touch screen within time T after the touch chip enters the async idle mode. In this case, the touch chip switches to the idle mode according to the first notification.

S310. In the idle mode, the touch chip acquires data 3.

In the idle mode, the touch chip performs scanning in a low-power scanning mode, and a data amount of the acquired data 3 is less than that of the data 1 in step S301 and that of the data 2 in step S308.

S311. The touch chip determines, according to the data 3, that a valid conductor signal is detected, and switches to the active mode.

In one example, the touch chip may determine, according to the following ways, whether a valid conductor signal is detected:

Whether there is a capacitance value in the data 3 that exceeds a second capacitance value threshold is determined. If yes, the touch chip determines that a valid conductor signal is detected. If no, the touch chip determines that no valid conductor signal is detected.

The second capacitance value threshold is less than the aforementioned first capacitance value threshold.

S312. In an active mode, the touch chip acquires data 4.

In the active mode, the touch chip performs scanning in a two-dimensional data scanning manner to acquire capacitance value data used for detecting a touch position. The data 4 is the capacitance value data that may be used for detecting the touch position.

S313. The touch chip sends the data 4 and an active mode identifier to the host.

The touch chip may set a scanning mode identifier bit in a data structure sent to the host, so as to identify the scanning mode currently used by the touch chip.

For example, in one example, the data structure may be as shown in Table 2 below.

TABLE 2

| Scanned data | Scanning mode identifier bit | | |
| | Active mode | Async idle mode | Idle mode |
|---|---|---|---|
| Data 4 | 1 | 0 | 0 |

When the touch chip reports data acquired in the three scanning modes (the active mode, the async idle mode, and the idle mode) to the host, the data structure may include the scanning mode identifier bit in Table 2.

In Table 2, the scanning mode corresponding to the data 1 represents the scanning mode currently used by the touch chip. For example, according to the data in Table 2, it can be seen that the scanning mode currently used by the touch chip is the active mode. If the scanning mode identifier bit is 100, it indicates that the scanning mode currently used by the touch chip is the active mode.

S314. The host switches to the active mode according to the active mode identifier, and determines coordinates of the touch position according to the data 4.

The host obtains, according to the active mode identifier, that the scanning mode currently used by the touch chip is the active mode, so the host also switches to the active mode. The algorithm processing module in the host processes the data 4 to obtain the coordinates of the touch position.

S315. The algorithm processing module in the host sends the coordinates of the touch position to the coordinate reporting module.

S316. The coordinate reporting module in the host reports the coordinates of the touch position to the touch input module (see FIG. 2).

In this embodiment, the touch chip completes a switching process from the active mode to the async idle mode to the idle mode to the active mode.

It should be noted that, the host has the same working way in the async idle mode and the idle mode. Therefore, the host enters the async idle mode, which can be seen as entering the idle mode.

From the above embodiments, it can be seen that in this embodiment, when the host detects no valid touch signal (when the user raises the finger or the stylus from the touch screen), the host may immediately reduce the frequency of reading and processing the scanned data, instead of reducing the frequency after waiting for a period of time. This reduces the power consumption of the host, thereby reducing the overall power consumption of the electronic device and prolonging the standby time of the electronic device.

The valid touch signal is a signal with signal strength greater than a second strength threshold set by the host.

Meanwhile, in order to cope with a case where the user quickly implements next touch, in this embodiment, the touch chip still maintains the same acquisition frequency and scanning mode as those in the active mode, and may still quickly acquire two-dimensional scanned data in real time, thereby ensuring a quick response to touch.

Figure 4:
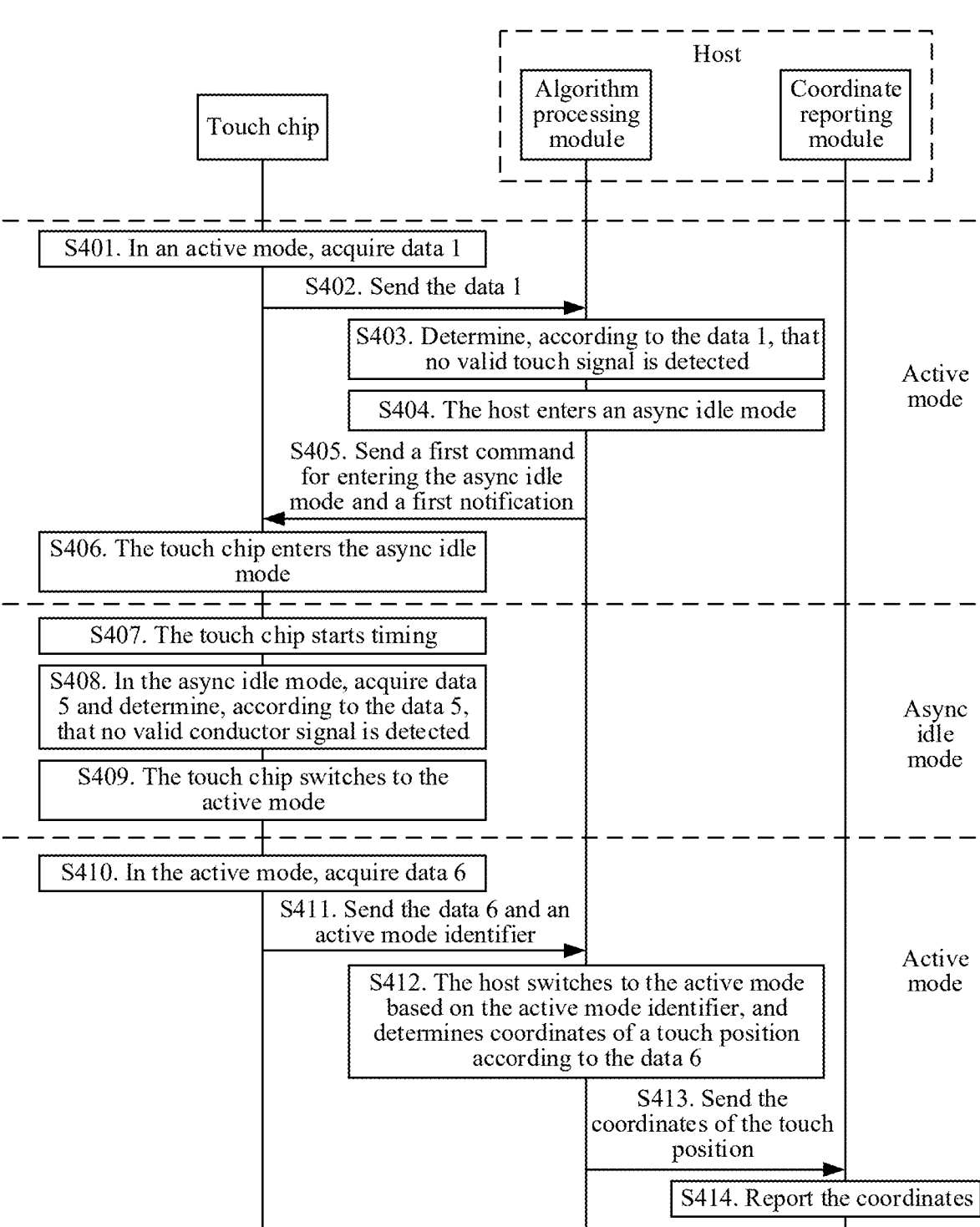
FIG. 4 is a schematic diagram exemplarily showing another interaction between a touch chip and a host.

FIG. 4 is a schematic diagram exemplarily showing another interaction between a touch chip and a host. Referring to FIG. 4, in the embodiments of this application, an interaction process between the touch chip and the host may include the following steps:

S401. In an active mode, the touch chip acquires data 1.

In the active mode, the touch chip performs two-dimensional data scanning at a first frequency. The data 1 in this step is two-dimensional scanned data, namely, capacitance value data that may be used for detecting a position of a touch finger.

S402. The touch chip sends the data 1 to the host.

An algorithm processing module of the host is configured to receive the data 1 sent by the touch chip and process the data 1 according to a preset algorithm. The algorithm processing module may have two data processing results of the data 1: One result indicates coordinates of a finger touch position and the other result is information indicating that no valid touch signal is detected.

S403. The host determines, according to the data 1, that no valid touch signal is detected.

Like step S303 described above, when the data processing result of the data 1 processed by the algorithm processing module in the host is the information indicating that no valid touch signal is detected, it may be determined that no valid touch signal is detected. For example, when a user touches the screen of the electronic device with a finger and then raises the finger, the host will detect no valid touch signal.

S404. The host enters an async idle mode.

S405. The host sends a first command for entering the async idle mode and a first notification to the touch chip.

S406. The touch chip enters the async idle mode.

S407. The touch chip starts timing.

Step S401 to step S407 correspond to step S301 to step S307 described above in a one-to-one manner. For detailed explanations of step S401 to step S407, refer to the related explanations of step S301 to step S307. This will not be elaborated here.

S408. In the async idle mode, the touch chip acquires data 5 and determines, according to the data 5, that a valid conductor signal is detected.

If a conductor such as a finger or a stylus approaches to a touch screen during the async idle mode, the touch chip will detect a valid conductor signal.

S409. The touch chip switches to the active mode.

If the touch chip detects a valid conductor signal during the async idle mode, it indicates that there is a conductor such as a finger or a stylus approaching the touch screen. In this case, the touch chip immediately switches to the active mode.

S410. In the active mode, the touch chip acquires data 6.

In the active mode, the touch chip performs two-dimensional data scanning at the first frequency to acquire capacitance value data used for detecting the touch position. The data 6 is the capacitance value data that may be used for detecting the touch position.

S411. The touch chip sends the data 6 and an active mode identifier to the host.

The data 6 and the active mode identifier may be packaged in one data structure for transmission. As shown in Table 2 above, the data structure will not be elaborated here.

S412. The host switches to the active mode based on the active mode identifier, and determines coordinates of the touch position according to the data 6.

The host obtains, according to the active mode identifier, that the scanning mode currently used by the touch chip is the active mode, so the host also switches to the active mode. The algorithm processing module in the host processes the data 6 to obtain the coordinates of the touch position.

S413. The algorithm processing module in the host sends the coordinates of the touch position to the coordinate reporting module.

S414. The coordinate reporting module in the host reports the coordinates of the touch position to the touch input module (see FIG. 2).

In this embodiment, the touch chip completes the switching process from the active mode to the async idle mode to the active mode.

From the above embodiments, it can be seen that in this embodiment, when the host detects no valid touch signal (when the user raises the finger or the stylus from the touch screen), the host may immediately reduce the frequency of reading and processing the scanned data, instead of reducing the frequency after waiting for a period of time. This reduces the power consumption of the host, thereby reducing the overall power consumption of the electronic device and prolonging the standby time of the electronic device.

When the host detects no valid touch signal, the host immediately reduces the frequency of reading and processing the scanned data, and still maintains the same acquisition frequency and scanning mode as those in the active mode. In this way, when the user performs a touch operation again within short time after the user raises the finger or the stylus, the touch chip may quickly and acquire two-dimensional scanned data including touch position information in real time, thereby ensuring a quick response to touch. Moreover, the touch chip immediately switches to the active mode as it detects a valid conductor signal generated by the finger or stylus approaching the touch screen, so it ensures that the two-dimensional scanned data including the touch position information may be quickly processed by the host, and the coordinates of the touch position are reported to a touch input module of a framework layer.

In order to provide a clearer explanation of the scanning mode switching process of the touch chip, the following will further explain the switching process through the accompanying drawings.

Figure 5:
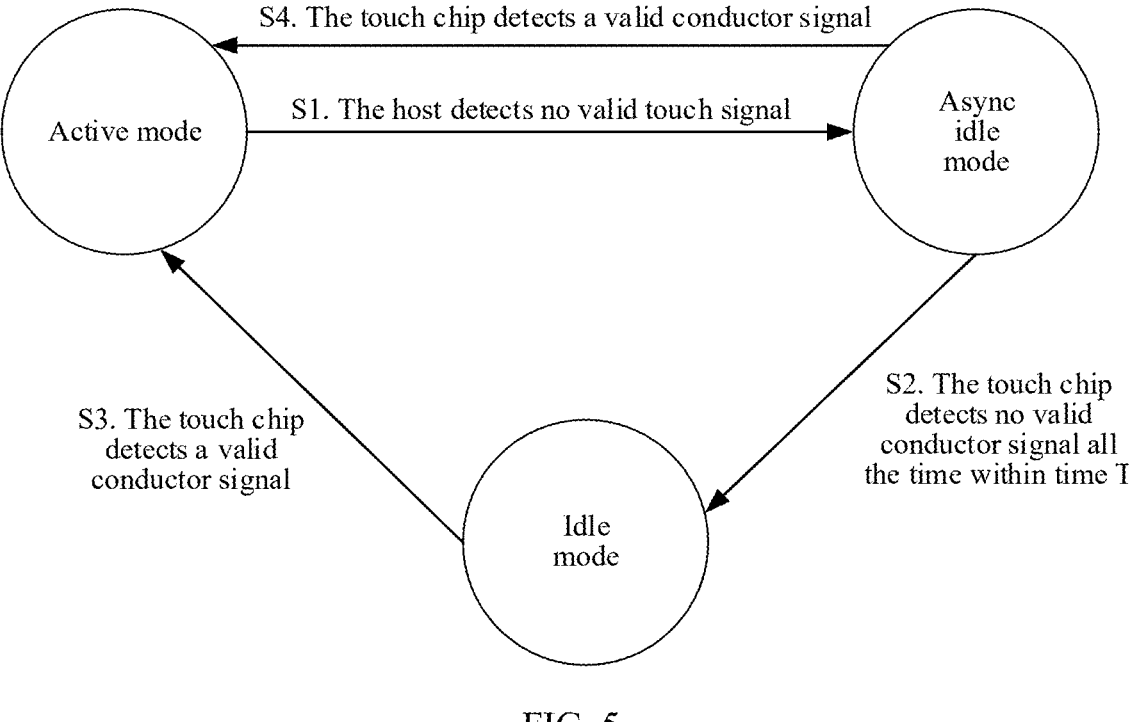
FIG. 5 is a schematic diagram exemplarily showing a scanning mode switching process of a touch chip.

FIG. 5 is a schematic diagram exemplarily showing a scanning mode switching process of a touch chip. Referring to FIG. 5, the scanning mode switching process of the touch chip may include:

S1. In an active mode, when a conductor such as a finger or a stylus is raised from a touch screen and a host detects no valid touch signal, the touch chip is informed to immediately switch to an async idle mode.

Figure 6:
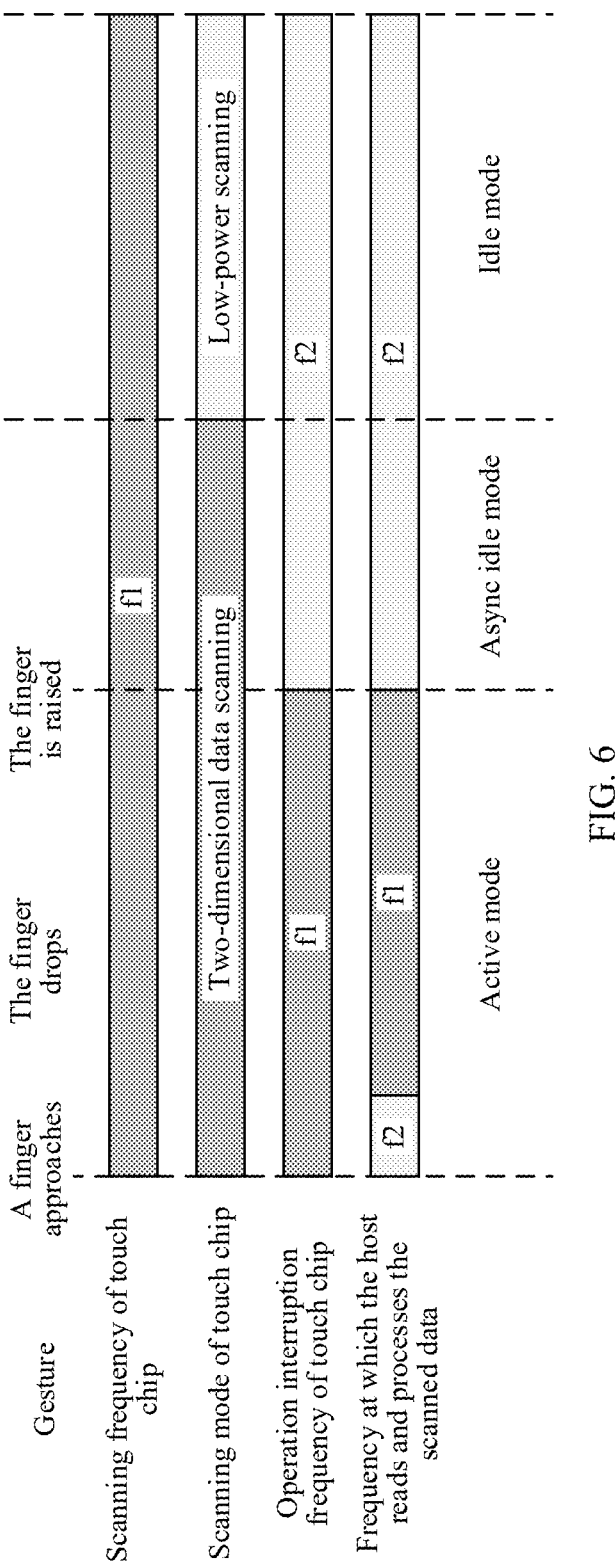
FIG. 6 is a schematic diagram exemplarily showing comparisons between a working frequency of a touch chip and a working frequency of a host in various scanning modes.

FIG. 6 is a schematic diagram exemplarily showing comparisons between a working frequency of a touch chip and a working frequency of a host in various scanning modes. Referring to FIG. 6, in an active mode, the touch chip performs two-dimensional data scanning at a frequency f1 and performs interruption at the frequency f1, and the host reads and processes the scanned data at the frequency f1. When a finger is raised, the touch chip immediately switches from the active mode to an async idle mode.

S2. If the touch chip detects no valid conductor signal all the time within time T during the async idle mode, it indicates that there is no conductor such as a finger or a stylus approaching the touch screen. In this case, the touch chip automatically switches to an idle mode.

Continuing to refer to FIG. 6, in the async idle mode, the touch chip performs two-dimensional data scanning at the frequency f1 and performs interruption at a frequency f2, and the host reads and processes the scanned data at the frequency f2. After the finger is raised for a period of time, the touch chip switches from the async idle mode to the idle mode.

S3. If the touch chip detects a valid conductor signal all the time in the idle mode, it indicates that there is a conductor such as a finger or a stylus approaching the touch screen. In this case, the touch chip automatically switches to the active mode.

Continuing to refer to FIG. 6, in the idle mode, the touch chip performs low-power scanning at the frequency f1 and performs interruption at a frequency f2, and the host reads and processes the scanned data at the frequency f2. When there is a finger approaching the touch screen, the touch chip immediately switches from the idle mode to the active mode.

Referring to FIG. 5, the scanning mode switching process of the touch chip may further include:

S1. In an active mode, when a conductor such as a finger or a stylus is raised from a touch screen and a host detects no valid touch signal, the touch chip is informed to immediately switch to an async idle mode.

S4. If the touch chip detects a valid conductor signal within time T in the async idle mode, it indicates that there is a conductor such as a finger or a stylus approaching the touch screen. In this case, the touch chip automatically switch to the active mode.

The embodiments of this application further provide an electronic device. The electronic device includes a memory and a processor. The memory is coupled to the processor. The memory stores program instructions. The program instructions, when executed by the processor, cause the electronic device to perform the touch system control method performed by the foregoing electronic device.

It may be understood that to implement the foregoing functions, the electronic device includes corresponding hardware structures and/or software modules for performing the functions. Algorithm steps in the examples described with reference to the embodiments disclosed in this specification can be implemented by hardware or a combination of hardware and computer software in this application. Whether a function is implemented in hardware or in a manner of driving hardware by computer software depends on particular applications and design constraint conditions of the technical solutions. A person of skill in the art may use different methods to implement the described functions with reference to embodiments for each particular application, but it should not be considered that the implementation goes beyond the scope of this application.

This embodiment further provides a computer storage medium. The computer storage medium stores computer instructions. The computer instructions, when run on an electronic device, cause the electronic device to perform steps of the above relevant methods to implement the touch system control method in the above embodiments.

This embodiment further provides a computer program product. The computer program product, when run on a computer, causes the computer to perform the above related steps to implement the touch system control method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the touch system control method in the foregoing embodiments.

The electronic device, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the above-described apparatus embodiments are merely illustrative. For example, the division of the modules or units is only one type of logical functional division, and other divisions is achieved in practice. For example, multiple units or components may be combined or integrated into another apparatus, or some features may be omitted, or not executed. In addition, the shown or discussed mutual coupling or direct coupling or communication connection is an indirect coupling or communication connection through some interfaces, apparatuses or units, and is in an electrical, mechanical or another form.

The units described as separate parts may or may not be physically separated, and parts displayed as units may or may not be one or a plurality of physical units, that is, may be located at one position, or may be distributed to a plurality of different places. Some or all of the units are selected according to actual needs to achieve the purpose of the solution of this embodiment.

In addition, functional units in embodiments of this application may be integrated into one processing unit, or each of the units may exist alone physically, or two or more units are integrated into one unit. The integrated units mentioned above may be implemented in both a hardware form and a software functional unit form.

Both any content of the various embodiments of this application and any content of a same embodiment may be freely combined. Any combination of the foregoing content falls within the scope of this application.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present disclosure. The foregoing storage medium includes: various media that may store program codes, such as a USB flash disk, a mobile hard disk, a read only memory (read only memory, ROM), a random access memory (random access memory, RAM), a magnetic disk, or a compact disc.

The embodiments of this application have been described above with reference to the accompanying drawings. This application is not limited to the specific implementations described above, and the specific implementations described above are merely exemplary and not restrictive. Those of ordinary skill in the art may make various forms under the teaching of this application without departing from the spirit of this application and the protection scope of the claims, and these forms shall all fall within the protection of this application.

Steps of methods or algorithms described in combination with the content disclosed in the embodiments of this application may be implemented by hardware, or may be implemented by a processor by executing software instructions. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or a storage medium in any other forms well-known in the art. For example, a storage medium is coupled to a processor, so that the processor may read information from the storage medium or write information into the storage medium. Certainly, the storage medium may be a component of the processor. The processor and the storage medium may be located in an ASIC.

A person skilled in the art should be aware that in one or more of the above examples, the functions described in the embodiments of this application may be implemented using hardware, software, firmware, or any combination thereof. When implemented by using software, the functions may be stored in a computer-readable medium or may be used as one or more instructions or code in a computer-readable medium for transmission. The computer-readable medium includes a computer storage medium and a communication medium, where the communication medium includes any medium that enables a computer program to be transmitted from one place to another place. The storage medium may be any available medium accessible to a general-purpose or dedicated computer.

The embodiments of this application have been described above with reference to the accompanying drawings. This application is not limited to the specific implementations described above, and the specific implementations described above are merely exemplary and not restrictive. Those of ordinary skill in the art may make various forms under the teaching of this application without departing from the spirit of this application and the protection scope of the claims, and these forms shall all fall within the protection of this application.

The invention claimed is:

1. A touch system control method, applied to an electronic device, wherein the electronic device comprises a touch chip, a touch panel, and a host; and the method comprises:

in an active mode, controlling, by the touch chip, the touch panel to perform two-dimensional data scanning at a first frequency to obtain first scanned data, wherein the first scanned data is used for detecting a touch position;

sending, by the touch chip, the first scanned data to the host at the first frequency;

when the host determines, according to the first scanned data, that no valid touch signal is detected, switching, by the host, to an async idle mode, and sending a first command for switching to the async idle mode to the touch chip; and switching, by the touch chip, to the async idle mode according to the first command, wherein in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position.

2. The method according to claim 1, wherein after the switching, by the host, to an async idle mode, the method further comprises:

sending, by the host, a first notification to the touch chip, wherein the first notification is used for instructing, when the touch chip detects no valid conductor signal within first time after receiving the first notification, the touch chip to switch to an idle mode after the first time.

3. The method according to claim 2, wherein the method further comprises:

in the async idle mode, when the touch chip detects no valid conductor signal within the first time after receiving the first notification, switching, by the touch chip, to the idle mode; and in the idle mode, controlling, by the touch chip, the touch panel to perform low-power scanning at the first frequency to obtain third scanned data, and sending the third scanned data to the host at the second frequency, wherein the third scanned data is used for detecting whether there is a conductor approaching a screen.

4. The method according to claim 3, wherein after the switching, by the touch chip, to the idle mode, the method further comprises:

in the idle mode, when the touch chip detects a valid conductor signal, switching, by the touch chip, to the active mode, and sending fourth scanned data acquired in the active mode and an active mode identifier to the host, wherein the fourth scanned data is used for detecting the touch position; and switching, by the host, to the active mode according to the active mode identifier, and determining the touch position according to the fourth scanned data.

5. The method according to claim 2, wherein the method further comprises:

in the async idle mode, when the touch chip detects a valid conductor signal within the first time after receiving the first notification, switching, by the touch chip, to the active mode, and sending fourth scanned data acquired in the active mode and an active mode identifier to the host, wherein the fourth scanned data is used for detecting the touch position; and switching, by the host, to the active mode according to the active mode identifier, and determining the touch position according to the fourth scanned data.

6. The method according to claim 3, wherein the low-power scanning is self-capacitance scanning or mutual-capacitance scanning.

7. The method according to claim 1, wherein the first frequency is 120 HZ or 240 HZ, and the second frequency is 1 HZ.

8. An electronic device, comprising:

a touch chip, a touch panel, and a host, wherein the touch chip is configured to:

in an active mode, control the touch panel to perform two-dimensional data scanning at a first frequency to obtain first scanned data, wherein the first scanned data is used for detecting a touch position;

send the first scanned data to the host at the first frequency;

receive a first command sent by the host for switching to an async idle mode, wherein the first command is sent when the host determines, according to the first scanned data, that no valid touch signal is detected and the touch chip switches to the async idle mode; and switch to the async idle mode according to the first command, wherein in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position.

9. The electronic device according to claim 8, wherein after the sending, by the touch chip, the first scanned data to the host at the first frequency, the touch chip is further configured to:

receive a first notification sent by the host, wherein the first notification is used for instructing, when the touch chip detects no valid conductor signal within first time after receiving the first notification, the touch chip to switch to an idle mode after the first time.

10. The electronic device according to claim 9, wherein the touch chip is further configured to:

in the async idle mode, when the touch chip detects no valid conductor signal within the first time after receiving the first notification, switch to the idle mode; and in the idle mode, control the touch panel to perform low-power scanning at the first frequency to obtain third scanned data, and send the third scanned data to the host at the second frequency, wherein the third scanned data is used for detecting whether there is a conductor approaching a screen.

11. The electronic device according to claim 10, wherein after the switching, by the touch chip, to the idle mode, the touch chip is further configured to:

in the idle mode, when the touch chip detects a valid conductor signal, switch to the active mode, and send fourth scanned data acquired in the active mode and an active mode identifier to the host, wherein the fourth scanned data is used for detecting the touch position to cause the host to switch to the active mode according to the active mode identifier and determine the touch position according to the fourth scanned data.

12. The electronic device according to claim 9, wherein the touch chip is further configured to:

in the async idle mode, when the touch chip detects a valid conductor signal within the first time after receiving the first notification, switch to the active mode, and send fourth scanned data acquired in the active mode and an active mode identifier to the host, wherein the fourth scanned data is used for detecting the touch position to cause the host to switch to the active mode according to the active mode identifier and determine the touch position according to the fourth scanned data.

13. An electronic device, comprising:

a touch chip, a touch panel, and a host, wherein the host executed by a processor is configured to:

in an active mode, receive first scanned data sent by the touch chip, wherein the first scanned data is scanned data obtained by the touch chip controlling, in the active mode, the touch panel to perform two-dimensional data scanning at a first frequency, and the first scanned data is used for detecting a touch position;

determine according to the first scanned data, whether a valid touch signal is detected;

when no valid touch signal is detected, switch to an async idle mode; and send to the touch chip, a first command for switching to the async idle mode to cause the touch chip to switch to the async idle mode according to the first command, wherein in the async idle mode, the touch chip controls the touch panel to perform two-dimensional data scanning at the first frequency to obtain second scanned data, and sends the second scanned data to the host at a second frequency; the second frequency is less than the first frequency; and the second scanned data is used for detecting the touch position.

14. The electronic device according to claim 13, wherein after the switching, by the host, to an async idle mode, the host is further configured to:

send a first notification to the touch chip, wherein the first notification is used for instructing, when the touch chip detects no valid conductor signal within first time after receiving the first notification, the touch chip to switch to an idle mode after the first time.

15. The electronic device according to claim 14, wherein the host is further configured to:

receive fourth scanned data and an active mode identifier sent by the touch chip, wherein the fourth scanned data and the active mode identifier are sent when the touch chip detects a valid conductor signal in the idle mode and the touch chip switches to the active mode; and switch to the active mode according to the active mode identifier, and determining the touch position according to the fourth scanned data.

* * * * *